Figure 1:
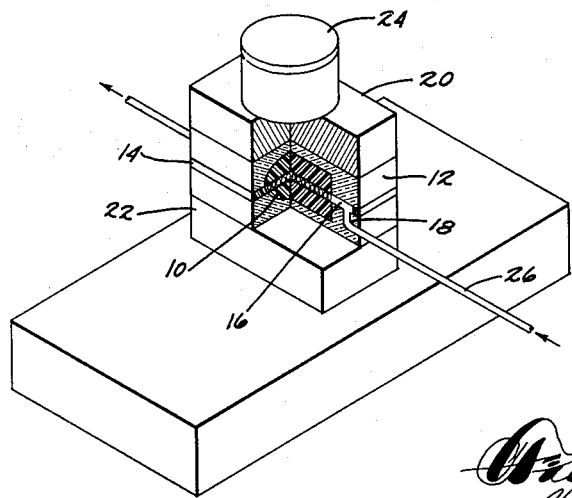

March 30, 1965     J. L. HUITT ETAL     3,175,616

METHOD FOR TREATING A SUBSURFACE FORMATION

Filed May 16, 1962

INVENTORS
JIMMIE L. HUITT
BRUCE B. McGLOTHLIN
BY EDWARD TOPANELIAN, JR.

ATTORNEY

United States Patent Office 3,175,616
Patented Mar. 30, 1965

3,175,616
METHOD FOR TREATING A SUBSURFACE
FORMATION
Jimmie L. Huitt, Shaler Township, Allegheny County,
Bruce B. McGlothlin, O'Hara Township, Allegheny
County, and Edward Topanelian, Jr., Pittsburgh, Pa.,
assignors to Gulf Research & Development Company,
Pittsburgh, Pa., a corporation of Delaware
Filed May 16, 1962, Ser. No. 195,057
5 Claims. (Cl. 166—42)

This invention relates to a method of increasing the productive capacity of wells and more particularly to a method of creating fractures of high fluid carrying capacity in hard formations.

It has become the usual practice in completing a well to create fractures extending from the well into the oil or gas bearing formation from which well fluids are to be produced. Fracturing is accomplished by pumping a fracturing liquid down the well and into contact with the underground formation to be fractured. The pressure on the fracturing liquid is increased to overcome the tensile strength of the formation and the weight of the overburden and thereby create the fracture, which is usually indicated by a sudden drop in the pressure on the fracturing fluid. A propping agent is suspended in a liquid which follows the fracturing liquid down the well and into the fracture. The propping agent is deposited in the fracture and prevents closing of the fracture when the pressure on the liquid is released.

Sand, usually in the particle size of the order of 20 to 40 mesh, was initially widely used as a propping agent. As the art of hydraulic fracturing of underground formations has progressed, it has become more and more common to use a propping agent comprised of larger particles to increase the fluid carrying capacity of the fracture. Frequently, particularly when the formation fractured is hard, the maximum fluid carrying capacity of the fracture will be obtained when a partial monolayer of propping agent is deposited in the fracture, and large sizes of propping agent are then highly advantageous in increasing the width of the fracture.

It has been found that upon reduction of the pressure on the fracturing fluid after sand has been deposited in a fracture, hard formations, particularly those at great depths where they are subjected to high overburden loads, will crush sand particles used as propping agents. The resultant fines of sand either are deposited in the small openings between grains of sand which have not been crushed and plug the openings therebetween, or are washed out of the fracture and no longer function as a propping agent. Either plugging of the small opening with fines or closing of the fracture because of insufficient propping agent will diminish the capacity of the fracture to deliver fluids to the well. The term "hard formations" is used to designate formations which will crush sand particles having an $L/D^2$ ratio of 10,000 (where L is the maximum load in pounds carried by a particle and D is the diameter of the particle in inches) upon the application of pressure, as distinguished from soft formations which will envelop the sand particles. Unfortunately the $L/D^2$ ratio of sand particles and ordinary glass spheres decreases as the particle size increases; hence the difficulty with crushing of the propping agent is more severe when the propping agent particles are large.

Several different types of propping agents have been suggested to increase the fluid carrying capacity of fractures in hard formations. One suggestion has been to use deformable materials such as aluminum and walnut shells which will pancake when subjected to heavy loads. It has been found that the aluminum particles are chemically attacked by formation brines and other well fluids. Moreover, aluminum spheres, being malleable, are sometimes permanently flattened or otherwise deformed in going through the liquid handling equipment that is used to suspend and transport the fracturing liquid down the well and into the fracture. The permanently deformed particles increase the danger of the propping agent "screening out." Walnut shells are resistant to oil well brines and are not damaged in liquid handling apparatus, but suffer the inherent disadvantage of deformable materials of yielding when pressure is applied by the surfaces of the fracture, which results in a narrower fracture of lower fluid carrying capacity. Deformable materials have the further disadvantage that if "screen outs" occur, deformation of the propping agent may completely plug openings between the particles when subjected to high pressures.

This invention resides in a method of fracturing hard underground formations penetrated by a well to form a fracture of high flow capacity in which novel glass spheres are deposited in the fracture to prop the fracture open. The glass spheres used in the process of this invention have been quenched from globules in a molten state and at a temperature exceeding 1800° F. to a temperature below 900° F., which results in the formation of glass particles able to withstand large compressive forces and which can be pumped through ordinary pumping equipment without appreciable crushing.

Figure 2:
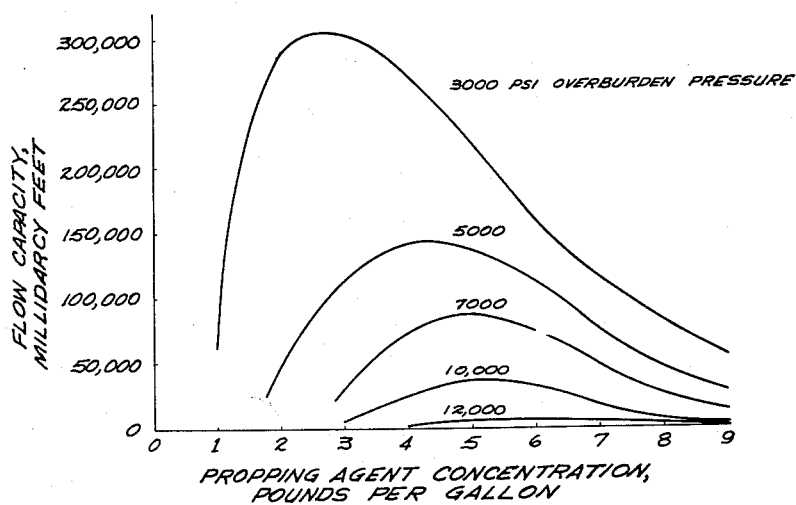

In the drawings:
FIGURE 1 is a perspective view diagrammatically illustrating a test cell used for the determination of the flow capacities of fractures propped with a propping agent; and FIGURE 2 illustrates a set of curves used to determine the optimum concentration of propping agent for the creation of a fracture of maximum fluid carrying capacity.

The novel propping agents of this invention are made by heating glass particles to a temperature in excess of 1800° F. such that any bubbling of gas in the glass either has not begun or has ceased, and then rapidly quenching the particles in a fluid at a temperature below about 900° F. The quenching fluid may be a liquid having a viscosity greater than water or a gas; however, water alone is not suitable. The temperature from which the glass is quenched will have a strong influence on the ability of the glass particles to resist crushing and deformation under compressive loads. For example, ordinary bottle glass spheres quenched in accordance with this invention from a temperature of 2200° F. in a fluid to a temperature below 900° F. have a higher strength than similar particles quenched from 1800° F., and it is preferred that the propping agent be prepared by quenching glass particles from a temperature above 2000° F.

The propping agents of this invention can be prepared from any of the usual types of glass such as soda-lime, lead, borosilicate, and high silica glasses. One of the advantages of the rapid quenching process is that it allows the production of glass particles capable of withstanding high compressive loads from ordinary soda-lime bottle glass.

The particles are formed by dropping molten globules of glass on an inclined heated surface of a material, such as graphite, which is not wetted by the glass. The globules of the glass roll along the surface of the graphite to form spheres and then roll from the surface into the quenching medium. Suitable quenching media are hydrocarbon oils such as SAE 10, SAE 20, and SAE 30 motor oils, viscous aqueous solutions such as aqueous water glass solutions, starch solutions, soap solutions or aqueous solutions of ethylene glycol, and mixtures of oils and melted greases and fats. The quenching medium is at a temperature below about 400° F., and is preferably at room temperature. After the temperature of the glass particles has reached a temperature below 900° F., further cooling may be accomplished in any convenient manner. It is not necessary that the cooling from 900° F. to lower temperatures be rapid.

The novel propping agents are strong and hard, but brittle in that they fail in tension when subjected to a compressive load. A convenient measure of the properties of the particles of the propping agent is given by the ratio of $L/D^2$, where L is the maximum compressive load in pounds a single particle can carry and D is the diameter of the particle in inches. The ratio of $L/D^2$ is determined by placing a measured single particle of propping agent between hard steel plates and pressing the plates together with a known force that is increased until the particle ruptures. The propping agents of this invention are characterized by an $L/D^2$ ratio exceeding 50,000 when the particles are tested between steel plates having a hardness of 35 Rockwell C. An excellent grade of propping sand in 10–20 mesh size has an $L/D^2$ ratio of approximately 10,000. Ordinary propping sand has an $L/D^2$ ratio of approximately 4,000. Ordinary glass spheres have an $L/D^2$ ratio approximately the same as the excellent grade of propping sand. The glass sphere propping agents of this invention are further characterized by being unyielding or substantially non-deformable when subjected to compresisve loads; hence, unlike malleable propping agents, they retain substantially their initial dimensions until they fail.

The propping agents are most useful in relatively large particle sizes of the order of 4 to 20 mesh on the U.S. Sieve Series of screens. It is preferred that the propping agents have a narrow range of particle sizes such as 4 to 6 mesh, 6 to 8 mesh, 8 to 12 mesh, or 12 to 20 mesh. Smaller particles, for example, 20 to 40 mesh, can also be used but ordinarily are not desirable because of the lower fluid carrying capacity of fractures propped with the smaller particles.

In the preferred method of using the propping agents, a fracture is created by applying a hydraulic pressure on the formation to be fractured and increasing the pressure applied until rupture occurs. The fracture is extended to substantially the desired radial extent by displacing a measured volume of a fracturing liquid having low fluid loss characteristics into the fracture. The fracturing liquid is followed by a liquid having the propping agent suspended therein in a concentration of 0.1 to 6 pounds per gallon of the liquid. The liquid may or may not contain a gelling agent to improve the ability of the liquid to carry the propping agent. While the method described above is preferred, the propping agent can also be suspended in the liquid initially displaced into the fracture.

The fluid carrying capacity of fractures in hard field cores propped with the novel propping agent of this invention was compared with the fluid carrying capacity of fractures propped with other propping agents in a series of laboratory tests. Apparatus used in measuring the fluid carrying capacity of the fractures packed with different propping agents is illustrated in FIGURE 1 in which a core 10 of a hard formation is cast in an epoxy resin 12. The resultant block of the core and the epoxy resin was sawed lengthwise, whereby the sawed surfaces of the core simulated fracture surfaces. A urethane gasket 14 of known load carrying characteristics was placed around the core between the surfaces of the epoxy resin to confine the flow of liquid to the fracture. Suitable inlet channels 16 and 18 were cut in one end of the block of epoxy resin and other channels, not shown in the drawing, were cut in the other end of the epoxy resin to direct flow of liquids into and from the simulated fracture.

A measured weight of the propping agent to be tested was then placed between the surfaces of the fracture and the core of the epoxy resin placed between an upper load distributing plate 20 and a lower load distributing plate 22. The amount of propping agent used was determined by calculating the volume of liquid between the sawed surfaces of the core and the amount of propping agent that would be present in that volume of liquid at different concentrations of propping agent in the liquid. The load distributing plates were then placed below the head 24 of a hydraulic ram capable of applying a load of 200,000 pounds on the test specimen. An inlet line 26 was connected to a constant head device which supplied water to the test cell for determination of the fluid carrying capaicty of the fracture. Suitable pressure taps, not shown in the drawing, were provided in the cell to allow measurement of the pressure drop from the inlet to the outlet of the fracture.

In the test procedure, the desired load was applied by means of ram 24 and water caused to flow through the fracture. The capacity of the fracture was calculated by use of Darcy's law in accordance with the following equation:

$$(kW_f) = \frac{Qul}{b\Delta P}(33,800)$$

where $(kW_f)$ denotes fracture capacity, millidarcy feet
Q denotes flow rate, milliliters per second
u denotes viscosity, centipoises
l denotes length of test section, centimeters
b denotes breath of test section, centimeters
$\Delta P$ denotes pressure drop across test section, centimeters of water To provide an accurate basis of comparing one propping agent with another, it is desirable to compare the maximum fracture capacity that can be obtained with one propping agent, regardless of the concentration of the propping agent in the fracture, with the maximum fracture capacity obtained with the other propping agent. To allow such a comparison, the optimum concentration of propping agent for each of the propping agents is determined by making a series of runs with a given load on the ram 24 for different concentrations of propping agent. The results of the runs were plotted in a series of curves of the type illustrated in FIGURE 2 for the 8 to 12 mesh glass spheres of this invention in which the concentration of propping agent in pounds per gallon or liquid in the fracture is plotted against the fluid carrying capacity of the fracture. The maximum fracture fluid carrying capacities for several different field cores propped open with several different types of propping agents are set forth in Table I. In Table I, the novel propping agents of this invention are designated as "Glass, Special" to distinguish them from ordinary glass spheres which had not been rapidly quenched.

TABLE I

*Propped fracture flow capacities*

| Propping Agent | | Maximum Fracture Flow Capacity (1,000 md. ft.) At Given Overburden Pressure (p.s.i.) | | | |
|---|---|---|---|---|---|
| Size (mesh) | Type | 3,000 | 5,000 | 7,000 | 10,000 |
| TONKAWA SAND, LIPSCOMB COUNTY, TEXAS | | | | | |
| 8-12 | Sand | <1 | <1 | <1 | <1 |
| 8-12 | Walnut Shells | 40 | 25 | 15 | 10 |
| 8-12 | Aluminum | 50 | 30 | 20 | 15 |
| 8-12 | Glass, Special | 300 | 150 | 125 | 90 |
| 8-12 | Glass (Ordinary) | <1 | <1 | <1 | <1 |
| BEREA SANDSTONE, OHIO | | | | | |
| 8-12 | Sand | <1 | <1 | <1 | <1 |
| 8-12 | Walnut Shells | 40 | 20 | 15 | 7 |
| 8-12 | Aluminum | 65 | 35 | 25 | 15 |
| 8-12 | Glass, Special | 275 | 200 | 150 | 50 |
| 8-12 | Glass (Ordinary) | 70 | 20 | 2 | <1 |
| 10-20 | Sand | <1 | <1 | <1 | <1 |
| 12-20 | Walnut Shells | 25 | 15 | 10 | 5 |
| 12-20 | Glass, Special | 60 | 40 | 20 | 10 |
| 12-20 | Glass (Ordinary) | 20 | 7 | 1 | <1 |
| SAN ANDRES DOLOMITE, CRANE COUNTY, TEXAS | | | | | |
| 8-12 | Sand | <1 | <1 | <1 | <1 |
| 8-12 | Walnut Shells | 40 | 25 | 15 | 10 |
| 8-12 | Aluminum | 80 | 50 | 25 | 11 |
| 8-12 | Glass, Special | 300 | 150 | 90 | 40 |
| 8-12 | Glass (Ordinary) | <1 | <1 | <1 | <1 |
| 10-20 | Sand | <1 | <1 | <1 | <1 |
| 12-20 | Walnut Shells | 20 | 10 | 5 | 3 |
| 12-20 | Glass, Special | 90 | 55 | 30 | 6 |
| 12-20 | Glass (Ordinary) | <1 | <1 | <1 | <1 |
| DEVONIAN, CRANE COUNTY, TEXAS | | | | | |
| 8-12 | Sand | <1 | <1 | <1 | <1 |
| 8-12 | Walnut Shells | 45 | 25 | 15 | 10 |
| 8-12 | Aluminum | 95 | 45 | 30 | 15 |
| 8-12 | Glass, Special | 500 | 200 | 180 | 80 |
| 8-12 | Glass (Ordinary) | <1 | <1 | <1 | <1 |
| 10-20 | Sand | <1 | <1 | <1 | <1 |
| 12-20 | Walnut Shells | 20 | 10 | 5 | 3 |
| 12-20 | Glass, Special | 200 | 65 | 50 | 40 |
| 12-20 | Glass (Ordinary) | <1 | <1 | <1 | <1 |

It will be seen from Table I that in all instances the glass sphere propping agents of this invention create fractures of higher fluid carrying capacity than any of the other propping agents tested. At the lower test pressures, the fluid carrying capacity of a fracture propped with the glass spheres is as much as ten times the capacity of fractures propped with walnut shells and five times the capacity of fractures propped with aluminum pellets. In all instances, sand is substantially ineffective as a propping agent for the hard formations and resulted in fractures having a fluid carrying capacity less than 1,000 millidarcy feet.

As the pressure on the fracture was increased, the advantage of the special glass spheres over the other propping agents was retained; however, the margin of superiority of the glass diminished because of embedment of the glass particles in the surfaces of the fracture at the higher pressures. When embedment occurs, fine particles from the fracture faces drop into spaces between the propping agent. Although the margin of superiority of the special glass spheres is reduced at the high pressures, the importance of the superiority actually is increased at the high pressures because the fluid carrying capacity of the fracture is relatively low and may be the principal factor interfering with flow. An examination of the glass particles after the tests showed substantially no crushing of the special glass spheres even when the fracture was subjected to a load of 10,000 pounds per square inch. Except in the Berea sandstone cores, ordinary glass beads which have not been subjected to the rapid quenching of the novel propping agents of this invention resulted in fractures having substantially the same fluid carrying capacity as the fractures propped with sand. Berea sandstone has properties near the borderline between soft and hard formations.

The increasing use of propping agents of large particle size to prop fractures has caused some difficulty in pumping the propping agent down the well and into the fracture. Some of the large particles of propping agent are crushed as they pass through the pump and form a substantial amount of fines which are largely ineffective as propping agents. Malleable material such as aluminum have the objectionable feature of being deformed into particles that vary widely from the desired substantially spherical shape.

The pumpability of different propping agents was determined in a series of pumping tests in which the propping agents were suspended in an aqueous gel having a Marsh funnel capacity between 95 and 100 seconds. WG-4 gelling agent of the Halliburton Company, a guar gum, was used in the preparation of the gel. After the propping agents and the gel had been mixed sufficiently in a blender to provide a uniform suspension of the propping agents, the mixture was pumped through a centrifugal pump to a T-10 pumping unit and then through 50 feet of 2-inch line into a 250 gallon collection tank. A back pressure nozzle was installed at the outlet of the pipe. After all of the gel had been pumped into the collection tank, acid was added to the gel to break the gel and the liquid was decanted from the propping agent. Samples of the propping agent were washed, examined, and a screen analysis run to determine the pumpability of the propping agent. The results of the tests are presented in Table II:

*TABLE II*

*Pumping tests on propping agents*

| Type | Nominal Size (Mesh) | Pumped Concentration (PPG) | Screen Analysis | | | |
|---|---|---|---|---|---|---|
| | | | Screen Size (Mesh) | Percent Retained on Screen | | |
| | | | | Before Pumping | After Pumping at 5 BPM | | |
| | | | | | Not Deformed | Rolled | Flattened |
| Special Glass Pellets | 8-12 | 1.0 | 7 | | | | |
| | | | 8 | 2 | 2 | | |
| | | | 14 | 95 | 91 | | |
| | | | Pan | 3 | 7 | | |
| Portage Sand | 8-12 | 1.0 | 7 | | | | |
| | | | 8 | 4 | 3 | | |
| | | | 14 | 96 | 76 | | |
| | | | Pan | | 21 | | |
| Aluminum Pellets | 8-12 | 0.5 | 6 | | | | 0.1 |
| | | | 7 | | | | 0.1 |
| | | | 8 | | | | 0.5 |
| | | | 10 | 24.2 | 23.5 | 0.5 | 0.5 |
| | | | 12 | 75.4 | 73.7 | 0.3 | 0.3 |
| | | | Pan | 0.4 | 0.5 | 0.5 | |
| Rounded Walnut Shells | 8-12 | 0.5 | 7 | | | | |
| | | | 8 | 1 | 1 | | |
| | | | 14 | 97 | 97 | | |
| | | | Pan | 2 | 2 | | |

It will be noted from Table II that approximately 21 percent of the Portage Sand was crushed at it passed through the pump, whereas only 4 percent of the glass propping agents of this invention were crushed. Because of its malleable nature, the aluminum pellets were not crushed to particles of smaller size; however, 1.0 percent were flattened in passing through the pump and 1.3 percent were rolled into cylinders. The shape of the deformed particles was such that they would not pass readily through the fracture and would greatly increase the tendency of the aluminum pellets to screen out in the fracture. The rounded walnut shells, while deformable under a compressive load are not malleable; hence, they are not permanently flattened by passing through a pump. No measurable amount of the walnut shells was crushed in passing through the pump.

Tests were performed to determine the effect of immersion in brine and in Petrojel (an alkaline oil base fracturing fluid of Dowell Division of the Dow Chemical Company containing a soap as a gelling agent). The compressive strength of the glass sphere propping agents was tested before and after immersion in brine or Petrojel for periods of as long as 101 days at a temperature of 350° F. Neither the brine nor the Petrojel had any effect on the load carrying strength of the glass sphere propping agents.

The novel propping agents of this invention possess the unique combination of resistance to crushing and resistance to deformation. Because of these properties fractures in hard formations propped with the novel propping agents have high fluid carrying capacities. The propping agents are highly resistant to corrosion by well fluids and have a relatively low specific gravity which facilitates their suspension in liquids for transporting into a fracture.

We claim:
1. A method of increasing the productive capacity of a hard subsurface oil-bearing formation penetrated by a well comprising creating a fracture extending from the well into said hard formation, displacing rigid substantially spherical particles of soda-lime glass having a particle size in the range of approximately 4 to 40 mesh into the fracture, said glass particles being characterized by a ratio of $L/D^2$ in excess of 50,000, where L is the maximum compressive load a particle can withstand in pounds and D is the diameter of the particle in inches, said glass particles having been prepared by rapidly quenching molten globules of soda-lime glass from a temperature above 1800° F. to a temperature below 900° F. in a quenching medium at a temperature below 400° F. selected from the group consisting of liquids having a viscosity higher than the viscosity of water and gases, and reducing the pressure within the fracture whereby the propping agent holds the fracture open.

2. A method of increasing the productive capacity of a hard subsurface formation penetrated by a well comprising displacing a fracturing fluid down the well to the hard subsurface formation, increasing the pressure on the fracturing fluid to create a fracture in said hard subsurface formation, displacing rigid substantially spherical soda-lime glass particles suspended in a liquid down the well and into the fracture whereby the particles are deposited in the fracture, said glass particles having a particle size in the range of approximately 4 to 40 mesh and a ratio of $L/D^2$ in excess of 50,000, where L is the maximum compressive load in pounds carried by a single particle and D is the diameter of the particle in inches, said particles having been prepared by rapidly quenching molten globules of soda-lime glass from a temperature in excess of 2000° F. to a temperature below 900° F. in a liquid having a viscosity higher than the viscosity of water, the temperature of said liquid being lower than 400° F., and reducing the pressure in the fracture whereby the glass particles hold the fracture open.

3. A method of fracturing a subsurface formation penetrated by a well comprising displacing a fracturing liquid down the well to the subsurface formation, increasing the pressure on said fracturing liquid to create a fracture extending from the well into the formation, displacing into the fracture a liquid having suspended therein rigid substantially spherical particles of soda-lime glass having a particle size in the range of about 4 to 40 mesh, said glass particles being characterized by a ratio of $L/D^2$ in excess of 50,000, where L is the maximum compressive load in pounds carried by a single particle and D is the diameter of the particle in inches, said particles having been prepared by rapidly quenching molten soda-lime glass globules from a temperature in excess of 1800° F. to a temperature less than 900° F. in a quenching medium selected from the group consisting of liquids having a viscosity greater than water and gases, said quenching medium having a temperature below 400° F., and releasing the pressure on the liquid to deposit the glass particles in the fracture.

4. A method of increasing the productive capacity of a hard subsurface hydrocarbon-bearing formation penetrated by a well comprising applying hydraulic pressure on the formation, increasing the hydraulic pressure on the formation until rupture of the formation occurs to create a fracture, displacing a fracturing liquid devoid of propping agent and having low fluid loss characteristics into the fracture to extend the fracture for the desired radial extent, thereafter displacing a liquid having suspended therein rigid substantially spherical soda lime glass particles in a concentration between 0.1 and 6 pounds per gallon adapted to place a monolayer of particles in the fracture, said substantially spherical glass particles having a particle size in the range of 4 to 40 mesh and an $L/D^2$ ratio in excess of 50,000, where L is the maximum compressive load in pounds carried by a single particle and D is the diameter of the particle in inches, said particles having been prepared by rapidly quenching molten soda lime glass globules from a temperature in excess of 1800° F. to a temperature below 900° F. in a quenching medium at a temperature less than 400° F., said quenching medium being selected from the group consisting of liquids having a viscosity higher than the viscosity of water and gases.

5. In a method of fracturing a hard subterranean formation to increase the flow of fluid from the formation into a well bore in which a fracturing liquid containing an alkaline gelling agent is pumped down the well into the formation under sufficient pressure to cause the formation to fracture, the improvement which comprises the step of incorporating into said fracturing fluid as propping agents resistant to the alkaline gelling agent discrete, rigid, substantially spherical soda-lime glass beads having a particle size in the range of 4 to 40 mesh and an $L/D^2$ ratio in excess of 50,000, where L is the maximum compressive load in pounds that can be carried by a single particle and D is the diameter of the particle in inches, said glass beads having been prepared by rapidly quenching molten globules of soda-lime glass from a temperature higher than 1800° F. to a temperature below 900° F. in a quenching medium at a temperature below 400° F., said quenching medium having been selected from the group consisting of liquids having a viscosity higher than water and gases.

References Cited by the Examiner
UNITED STATES PATENTS

| | | | |
|---|---|---|---|
| RE. 6,973 | 3/76 | De La Bastie | 65—114 |
| 2,148,630 | 2/39 | Lillie et al. | 65—116 |
| 2,460,977 | 2/49 | Davis et al. | 65—21 |
| 2,699,212 | 1/55 | Dismukes. | |
| 2,703,619 | 3/55 | Sutherlin. | |
| 2,774,431 | 12/56 | Sherborne. | |
| 2,859,819 | 11/58 | Trott. | |
| 2,950,247 | 8/60 | McGuire. | |
| 3,074,254 | 1/63 | Searight | 65—21 |
| 3,133,805 | 5/64 | Robinson | 65—21 |

BENJAMIN HERSH, *Primary Examiner.*

CHARLES E. O'CONNELL, *Examiner.*

UNITED STATES PATENT OFFICE
CERTIFICATE OF CORRECTION

Patent No. 3,175,616                      March 30, 1965

Jimmie L. Huitt et al.

It is hereby certified that error appears in the above numbered patent requiring correction and that the said Letters Patent should read as corrected below.

Column 4, line 53, for "capaicty" read -- capacity --; line 73, for "breath" read -- breadth --; column 5, line 14, for "or" read -- of --; column 8, lines 64 and 65, for "particels" read -- particles --; column 10, line 23, for "McGuire." read -- McGuire, Jr., et al. --; line 24, for "3,074,254" read -- 3,074,257 --.

Signed and sealed this 21st day of September 1965.

(SEAL)
Attest:

ERNEST W. SWIDER                      EDWARD J. BRENNER
Attesting Officer                      Commissioner of Patents